(12) United States Patent
Urata et al.

(10) Patent No.: US 7,346,914 B2
(45) Date of Patent: Mar. 18, 2008

(54) OPTICAL DISK DRIVE

(75) Inventors: Kazuo Urata, Shizuoka-ken (JP); Yasushi Hayashi, Shizuoka-ken (JP)

(73) Assignee: Yamaha Corporation, Hamamatsu-shi (JP)

( * ) Notice: Subject to any disclaimer, the term of this patent is extended or adjusted under 35 U.S.C. 154(b) by 296 days.

(21) Appl. No.: 10/826,495

(22) Filed: Apr. 16, 2004

(65) Prior Publication Data

US 2005/0010939 A1    Jan. 13, 2005

Related U.S. Application Data

(63) Continuation of application No. PCT/JP02/10638, filed on Oct. 11, 2002.

(30) Foreign Application Priority Data

Oct. 18, 2001   (JP) .............................. 2001-320303

(51) Int. Cl.
   *G11B 33/08* (2006.01)
   *G11B 17/04* (2006.01)
(52) U.S. Cl. ...................................... 720/651; 720/601
(58) Field of Classification Search ................ 720/651, 720/601
   See application file for complete search history.

(56) References Cited

U.S. PATENT DOCUMENTS 4,583,213 A * 4/1986 Bracken et al. ............. 369/261
6,493,310 B1 * 12/2002 Kim et al. ................... 720/611
6,643,251 B1 * 11/2003 Ikuta et al. .................. 720/703

FOREIGN PATENT DOCUMENTS

| JP | 54154310 A | * 12/1979 |
| JP | 05041077 A | * 2/1993 |
| JP | 08255316 A | * 10/1996 |
| JP | 09161467 A | * 6/1997 |
| JP | 2001-220275 | 4/2001 |
| JP | 110175 | 4/2001 |
| JP | 2001-160283 | 6/2001 |
| JP | 2001-250301 | 9/2001 |

OTHER PUBLICATIONS

Korean Patent Office, Office Action, Nov. 28, 2005.

* cited by examiner

*Primary Examiner*—Angel Castro
*Assistant Examiner*—Christopher R. Magee
(74) *Attorney, Agent, or Firm*—Pillsbury Winthrop Shaw Pittman LLP

(57) ABSTRACT

An air flow generated during disk rotation is rectified to suppress disk vibrations and prevent the qualities of recorded and reproduced signals from being degraded. Notches 24 and 26 are formed on top edges of right and left side walls 22 and 22 of a frame 10. Opposite ends of a clamp holder 28 along its long side direction are fixedly mounted on the notches 24 and 26. Rectifiers of repetitive structures 32 and 34 having a wave shape as viewed in plan are formed on the clamper holder 28 on the plate portions 28a and 28b on both sides of a clamper 30 and at edges on the output side of an air flow generated during disk rotation.

10 Claims, 12 Drawing Sheets

OPTICAL DISK DRIVE

RELATED APPLICATIONS

This application is a continuation of PCT application No. PCT/JP02/10638, filed Oct. 11, 2002, which is based upon, and claims priority from, Japanese Patent Application No. 2001-320303, filed Oct. 18, 2001.

TECHNICAL FIELD

The present invention relates to an optical disk drive such as an optical disk recording apparatus, an optical disk reproducing apparatus and an optical disk recording/reproducing apparatus, and more particularly to an optical disk drive capable of high speed operation.

BACKGROUND ART

Recent optical disk recording/reproducing techniques seek a high recording/reproducing speed.

As a disk rotates in an optical disk drive, an air flow is generated. This air flow changes to a turbulent flow as the disk rotates fast, and generates vibrations of the disk. These disk vibrations degrade the qualities of recorded and reproduced signals, and hinder the recording/reproducing speedup.

SUMMARY OF THE INVENTION

An object of the invention is to provide an optical disk drive having a mechanism of rectifying an air flow generated during disk rotation.

Another object of the invention is to provide an optical disk drive capable of preventing the qualities of recorded and reproduced signals from being degraded, by suppressing disk vibrations.

According to one aspect of the present invention, there is provided an optical disk drive wherein: a plate member is disposed above an optical disk under rotation; a guide space of an air flow is formed in between a lower surface of the plate member and a disk surface and in between an upper surface of said plate member and a housing above the plate member, the guide space facing the disk surface; and repetitive structures are formed on the plate member, the repetitive structure presenting a function of rectifying the air flow generated during disk rotation above the disk surface and extending along a direction crossing a disk track.

The repetitive structures formed on the plate member rectify the air flow generated during disk rotation so that disk vibrations can be suppressed even during high speed disk record and play and the qualities of recorded and reproduced signals can be prevented from being degraded.

The repetitive structure may have a repetitive shape as viewed in plan. The repetitive structure may also have a repetitive shape as viewed in elevation synchronized with the repetitive shape as viewed in plan.

In this specification, "above" "under", "plan" and "elevation" indicate positional relations when an optical disk drive is laid down (laid horizontally).

The plate member has end portions on the output side of the air flow generated along the plane of the plate member during disk rotation, the end portions extending along a direction crossing the disk track. The repetitive structure is formed on the end portions and has a wave shape such as a sine wave and a sawtooth wave.

The repetitive structure may have a wave shape as viewed in elevation formed on the end portions and also a wave surface shape extending from an edge of the wave shape to the flat plane of the plate member, the amplitude of the wave surface being gradually lowered at positions remotely from the edge of the plate member. The repetitive structure may be a plurality of convex or concave stripes formed on the lower surface of the plate member along the track direction.

The plate member may be made of a metal plate not formed with a rib on the edge portion crossing the disk track.

The repetitive structure may terminate at a position inner than an outer circumference of an optical disk by a predetermined distance.

The optical disk drive has a mechanism for rotating an optical disk in the state the optical disk is squeezed between a turntable and a clamper. The plate member may constitute a clamper holder of the mechanism.

The plate member may have an elongate plate shape, the clamper may be held in a central area of the plate member along a long side direction, opposite end portions of the plate member may be fixedly supported on a structural body, and the repetitive structure may be formed on plate portions of the plate member on both sides of the clamper along the long side direction.

The optical disk drive may have a mechanism for rotating an optical disk in the state the optical disk is squeezed between the turntable and clamper. The repetitive structure extending along a direction crossing the disk track may be formed on the clamper holder facing an optical disk, the repetitive structure presenting a function of rectifying the air flow generated above the disk surface during disk rotation.

In an optical disk wherein: a proper space is formed between right and left side walls of a structural body and an outer case member; opposite end portions of a clamper holder of an elongated plate along a long side direction are fixedly mounted on right and left side walls of the structural body at positions above an optical disk; and a clamper is held in a central area of the clamper holder along the long side direction, the optical disk having a mechanism of rotating the optical disk in the state that the optical disk is squeezed between the turntable and clamper, an opening may be formed through the right and left side walls of the structural body near the areas where the opposite end portions of the clamper holder along the long side direction are fixedly mounted, the opening guiding the air flow generated during disk rotation into the space formed between the right and left side walls of the structural body and the outer case member.

Since the area of the cross section of the path of an air flow above the clamper holder can be broadened, a rapid change in the pressure is reduced, disk vibrations can be suppressed even during high speed disk record and play, and the qualities of recorded and reproduced signals can be prevented from being degraded. Recesses are formed on top ends of the right and left side walls of the structural body, the opposite end portions of the clamper holder along the long side direction are fixedly mounted on the recesses. The opening may be the left space of the recess above the clamper holder at the areas where the opposite end portions are fixedly mounted.

The recess may be made wider than the length of the clamper holder along the short side direction. The opening may be the space formed between each end of the clamper holder along the short side direction and each end of the recess along its width direction.

Recesses are formed on top ends of the right and left side walls of the structural body, the opposite end portions of the clamper holder along the long side direction are fixedly mounted on the recesses. The recess is made wider than the length of the clamper holder along the short side direction. In this case, the opening may be the space formed between each end of the clamper holder along the short side direction and each end of the recess along its width direction.

The opening may be holes formed through the right and left side walls of the structural body.

The repetitive structure presenting a function of rectifying an air flow generated during disk rotation and having a wave shape as viewed in plan may be formed on both sides of a pickup advance opening of the disk tray extending along a direction crossing a tangential direction of a disk track.

The repetitive structure having the wave shape formed on the pickup advance opening of the disk tray rectifies an air flow generated during disk rotation. Therefore, disk vibrations can be suppressed even during high speed disk record and play and the qualities of recorded and reproduced signals can be prevented from being degraded.

A plurality of convex stripes may be formed on the inner surfaces of the side walls of the structural body facing a space accommodating an optical disk, the convex stripes extending along a horizontal direction and protruding into the space.

The plurality of convex stripes extending along the horizontal direction and formed on the inner surfaces of the side walls of the structural body rectify an air flow generated during disk rotation. Therefore, disk vibrations can be suppressed even during high speed disk record and play and the qualities of recorded and reproduced signals can be prevented from being degraded.

DETAILED DESCRIPTION OF THE INVENTION

Figure 1:
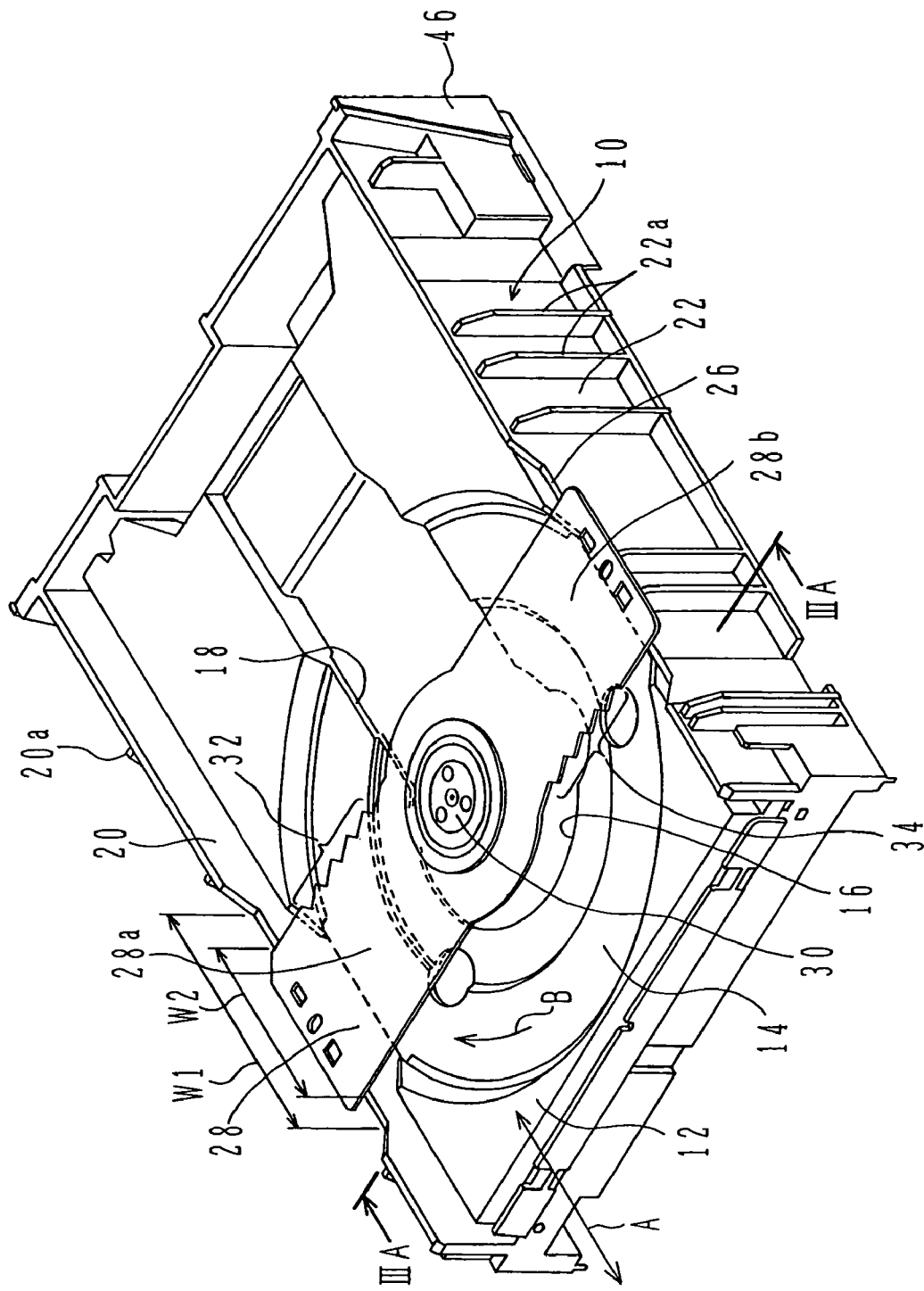
FIG. 1 is a perspective view of a CD-R/RW drive according to an embodiment of the invention.

Embodiments of the invention will be described with reference to the accompanying drawings. FIG. 1 shows a frame 10 constituting a chassis and a disk tray 12 accommodated in the frame 10 of a CD-R/RW drive capable of high speed recording/reproducing (an optical disk drive capable of recording/reproducing a CD-R disk and a CD-RW disk). On the front surface of the frame 10, a front panel is mounted which is formed with an opening through which a disk tray 12 is pulled out or pushed in. On the bottom surface of the frame, a circuit board is mounted, and an outer ornamental cover is mounted on the side, upper and back surfaces of the frame. The disk tray 12 is slid along a direction indicated by an arrow A to be pulled out or pushed in by a motor drive. The disk tray 12 is formed with a recess 14 on which an optical disk is placed, an opening 16 through which a turn table advances, and an opening 18 through which an optical pickup advances.

Notches 24 and 26 are formed on upper ends of right and left side walls 22 and 20 of the frame 10. A clamper holder 28 is mounted on the bottoms of the notches 24 and 26. The notches 24 and 26 are formed deeper than the thickness of the clamper holder 28. An additional space is formed above the clamper holder 28.

Figure 2:
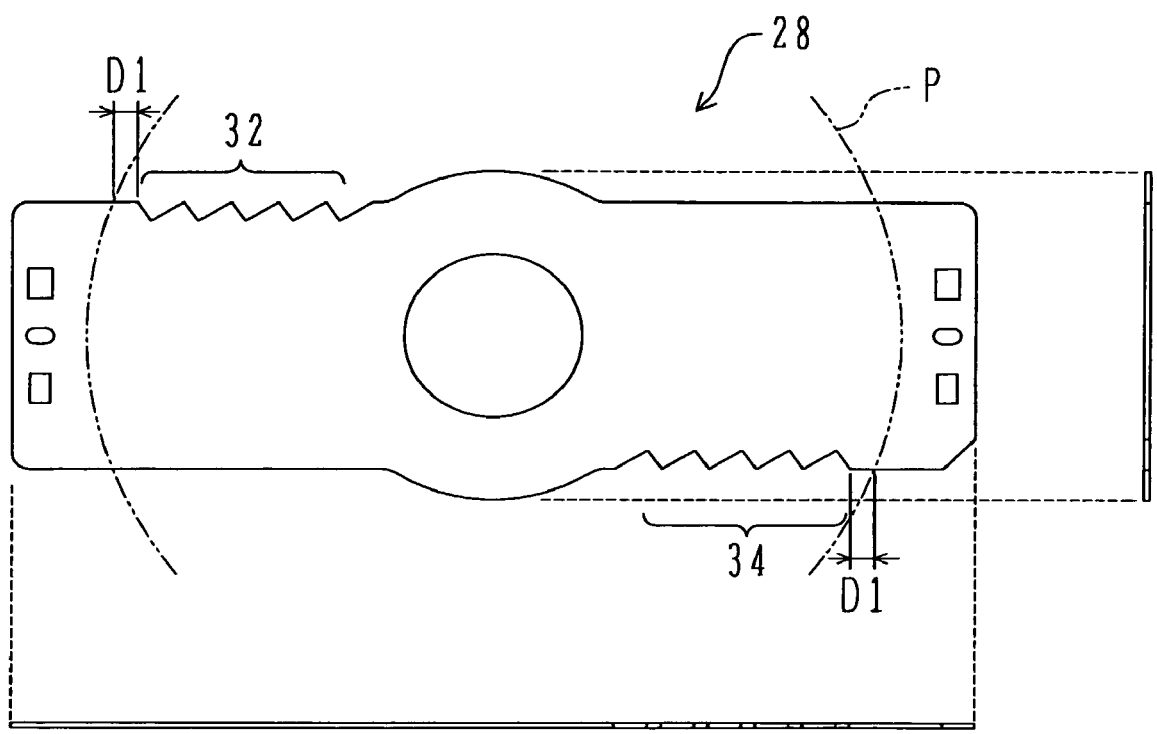
FIG. 2 is a plan view, a front view and a side view showing the detailed structure of a clamper holder 28 shown in FIG. 1.

The clamper holder 28 is made of an elongated metal plate (the detailed structure is shown in FIG. 2), and opposite end portions along its long side direction are fixed with screws at center positions of the notches 24 and 26 of the frame 10 along their width direction. The width W1 of the notches 24 and 26 is set sufficiently greater than a length W2 of the clamper holder 28 along its short side direction. A clamper 30 is rotatively mounted on the central area of the clamper holder 28 along its long and short side directions. The clamper 30 confronts a lower turntable.

As an optical disk rotates along an arrow B direction, an air flow is generated above the optical disk surface along the same direction as the arrow B direction. Plate portions 28a and 28b of the clamper holder 28 are disposed on both sides of the clamper 30. Repetitive structures 32 and 34 are formed on the edges of the plate portions on the output side of the air flow, the repetitive structure having a wave shape as viewed in plan (a straightforward stripe shape as viewed in elevation) and constituting rectifiers.

The surface of the clamper holder in contact with an air flow generated by the rotation of an optical disk imparts resistance to the air flow because of viscosity of the air. The resistance against an air flow changes with the length of the clamper holder surface along the direction of the air flow. Air is easy to flow in the space having a low resistance. The repetitive structure forms the space having a low resistance to an air flow and the space having a high resistance to the air flow, along the direction crossing the rotation direction of a disk. It can be considered that a turbulent flow is suppressed and a laminar air flow is generated easily which is in conformity with the surface topology of the clamper holder.

As shown in FIG. 2, the repetitive structures 32 and 34 have their outer edge detracted from the outer circumference position of an optical disk by a predetermined distance D1

(e.g., about 10 mm). It has been confirmed through experiments that the rectifying effect (disk vibration reducing effect) can be improved with the retracted outer edge more than the case that the repetitive structures 32 and 34 are formed to the outer circumference position.

Figure 3A:
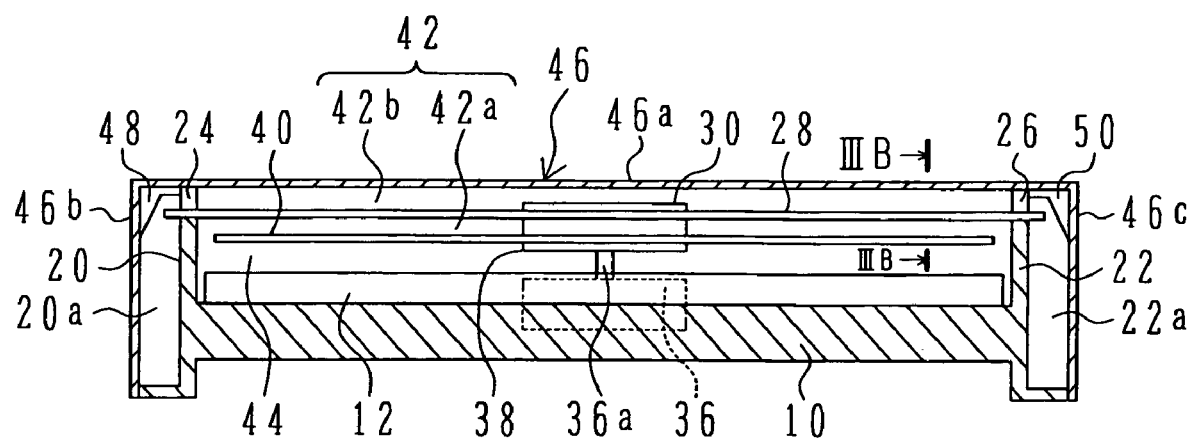
FIGS. 3A and 3B are cross sectional views during an optical disk record or play by the CD-R/RW drive shown in FIG. 1, taken along line IIIA-IIIA in FIG. 1, and along line IIIB-IIIB in FIG. 3A, respectively.

FIG. 3A shows the outline structure at the cross section taken along line IIIA-IIIA shown in FIG. 1 during an optical disk record or play by the CD-R/RW. A spindle motor 36 is mounted on the frame 10 in the state that it can be raised or lowered by a motor drive (usually a tray loading motor is used in common). A turntable 38 is mounted on the top of a rotary shaft 36a of the spindle motor 36.

As the disk tray 12 is loaded, the spindle motor 36 is raised and the turntable 38 raises an optical disk 40 (a CD specification disk such as a CD-R disk and a CD-RW disk) from the disk tray 12 to clamp the disk between the turn table and clamper 30. As the spindle motor 36 is driven, the optical disk 40 rotates to start a disk record or play with an optical pickup.

In this state, air flow spaces 42 and 44 are formed under and above the optical disk 40. The clamp holder 28 positions at the middle height of the air flow space 42 above the optical disk 40. The air flow space 42 above the optical disk 40 is therefore divided at the position of the clamper holder 28 into: an air flow space 42a between the lower surface of the clamper holder 28 and the upper surface of the optical disk 40; and an air flow space 42b between the upper surface of the clamper holder 28 and the lower surface of an upper plate 46a of the outer ornamental cover 46.

Ribs 20a and 22a are formed at a proper interval on the outer walls of the frame side walls 20 and 22. The rib does not exist substantially at the position higher than the clamper holder 28. Spaces 48 and 50 are formed between the frame side walls 20 and 22 and side wall plates 46b and 46c of the outer ornamental cover 46.

Figure 4:
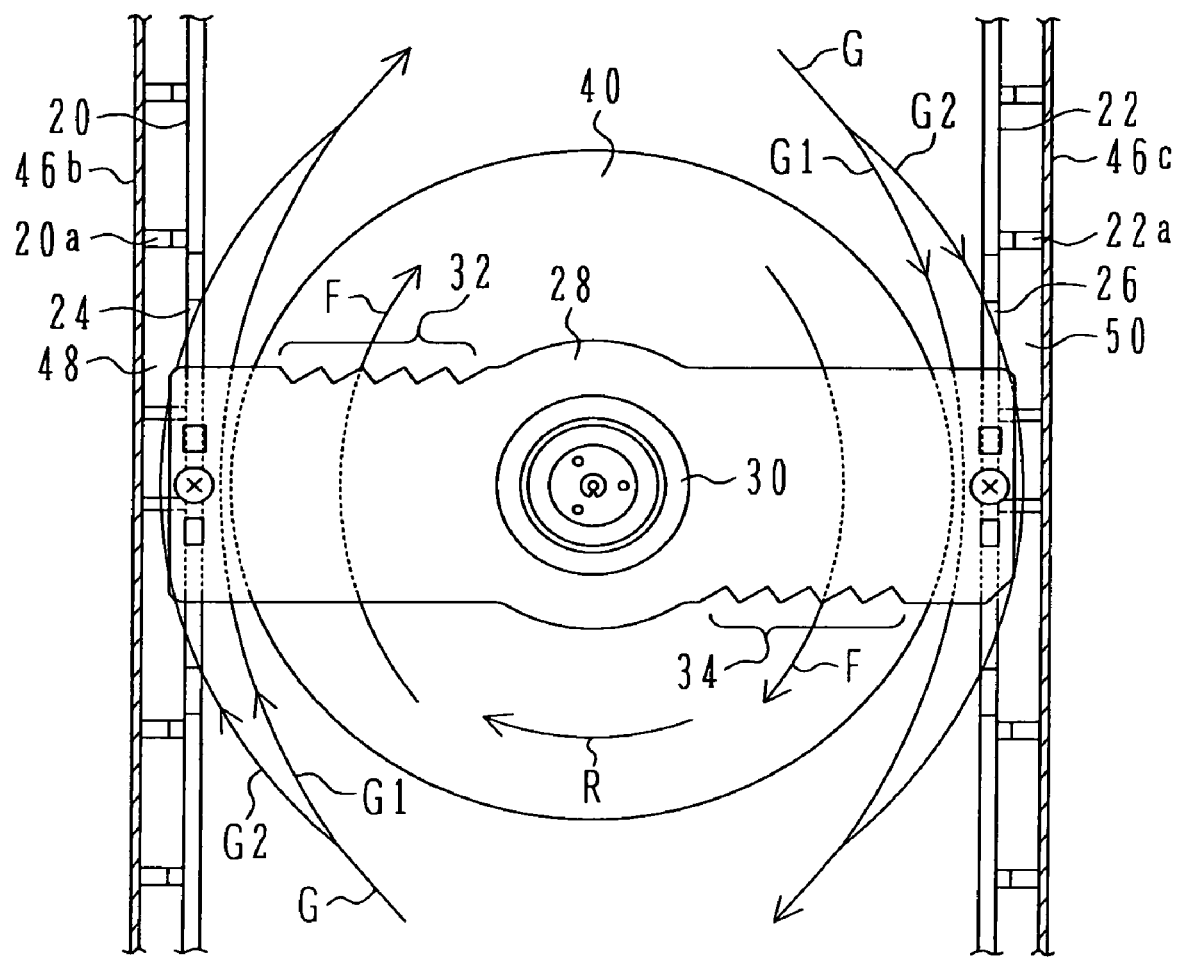
FIG. 4 is a plan view showing an air flow generated on the upper side of an optical disk during record or play by the CD-R/RW shown in FIG. 1.

FIG. 4 shows air flows generated on the upper side of an optical disk during disk record or play. As an optical disk 40 rotates, air flows are generated under and above the optical disk along the rotation direction. An air flow F generated along an upper surface of the optical disk 40 is rectified by the repetitive structures 32 and 34 having a wave shape as viewed in plan and formed on the outer edges of the clamper holder 28 on the air flow output side, to thereby suppress the generation of turbulent air flows. Disk vibrations are thereby suppressed during high speed rotation. An air flow F generated outside of the upper surface of the optical disk 40 is divided into upper and lower air flows by the clamper holder 28. An air flow G1 on the lower side of the clamper holder 28 flows in the space surrounded by the frame side walls 20 and 22.

An air flow G2 on the upper side of the clamper holder 28 also flows in the spaces 48 and 50 between the frame side walls 20 and 22 and the side plates 46b and 46c of the outer ornamental cover 46, via the notches 24 and 26. The cross section of the air flow G2 on the upper side of the clamper holder 28 can be broadened so that a rapid change in the pressure can be reduced to thereby further suppress disk vibrations during high speed rotation.

Figure 3B:
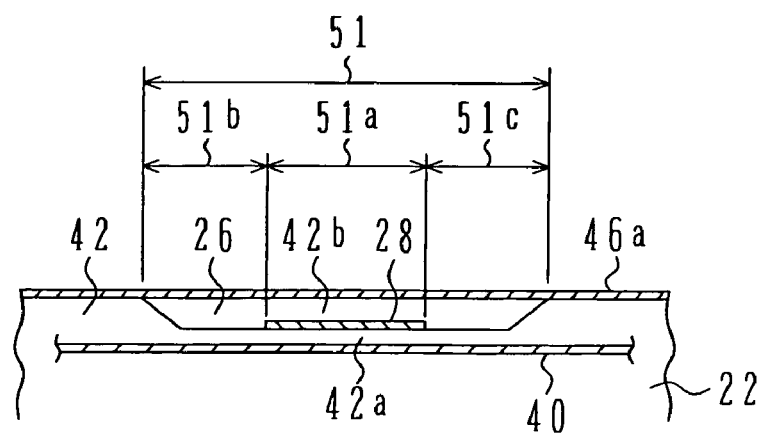

FIG. 3B is a cross sectional view taken along line IIIB-IIIB shown in FIG. 3A. An opening 51 to the spaces 48 and 50 defined by the notches 24 and 26 is a combination of: an opening 51a defined by a left space above the clamper holder 28; and openings 51b and 51c before and after the opening 51a and outside of the left spaces above the clamper holder 28. The opening 51 to the spaces 48 and 50 defined by the notches 24 and 26 is maintained broad in this way.

The turbulent suppressing effect can be obtained even if there is only the opening 51a without the openings 51b and 51c (i.e., even if the width of the notches 24 and 26 is set to approximately the length of the clamper holder 28 along its short side direction) or conversely even if there is only the openings 51b and 51c without the opening 51a (i.e., even if the upper space of the clamper holder 28 does not exist), because the air flow can be directed into the spaces 48 and 50.

Figure 5:
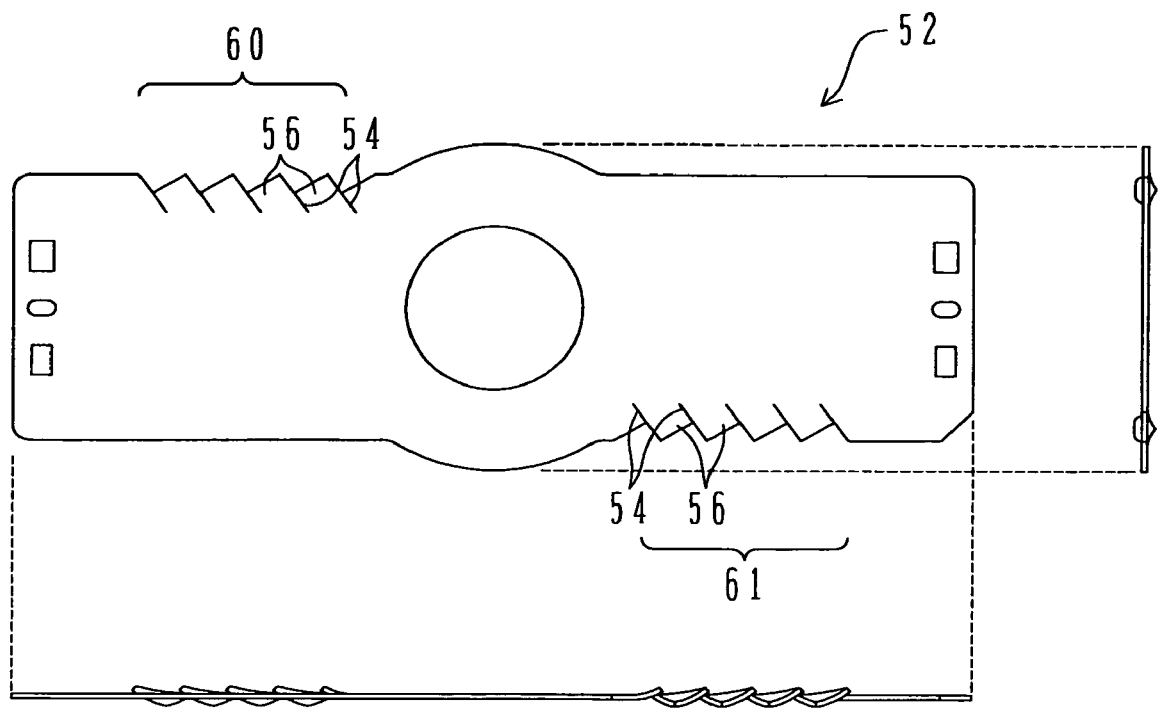
FIG. 5 is a plan view, a front view and a side view showing a rectifier formed on a clamper holder according to another embodiment of the invention.

FIG. 5 shows another configuration of the rectifier formed on the clamper holder. Repetitive structures 60 and 61 having a wave shape like that shown in FIG. 2 are formed on a clamper holder 52. In addition, a slit 54 is formed at the border of each wave, and each divided piece 56 is twisted. The repetitive structures have therefore a sawtooth shape as viewed both in plan and in elevation. As shown in the front view, a three-dimensional structure with a twist is disposed generally along the disk rotation direction, and constitutes a guide surface directly rectifying an air flow.

Description will be made on the measurement results of the disk vibration suppressing effect. Table 1 shows the measurement results of disk vibration angles during a predetermined high speed rotation for a variety of shapes of the clamper holder. The clamper holder width (a short side length of a rectangle excepting the central circular expansion portions) was set to 42 mm for all the clamp holders. A clamp holder without the rectifiers of the repetitive structures was made as the comparative example.

Figure 6:
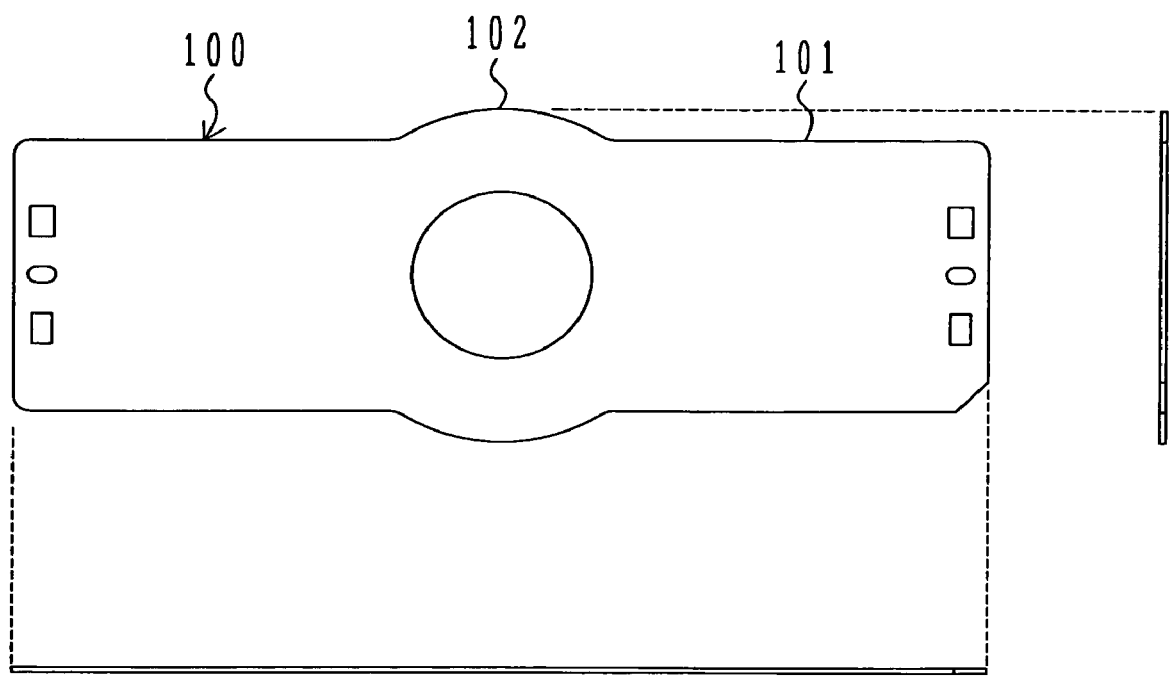
FIG. 6 is a plan view, a front view and a side view showing a clamper holder without a rectifier for the comparison purposes.

FIG. 6 shows the clamp holder as the comparative example. The clamp holder 100 has circular expansion portions 102 in the central area of a rectangular plate 101.

Figure 7:
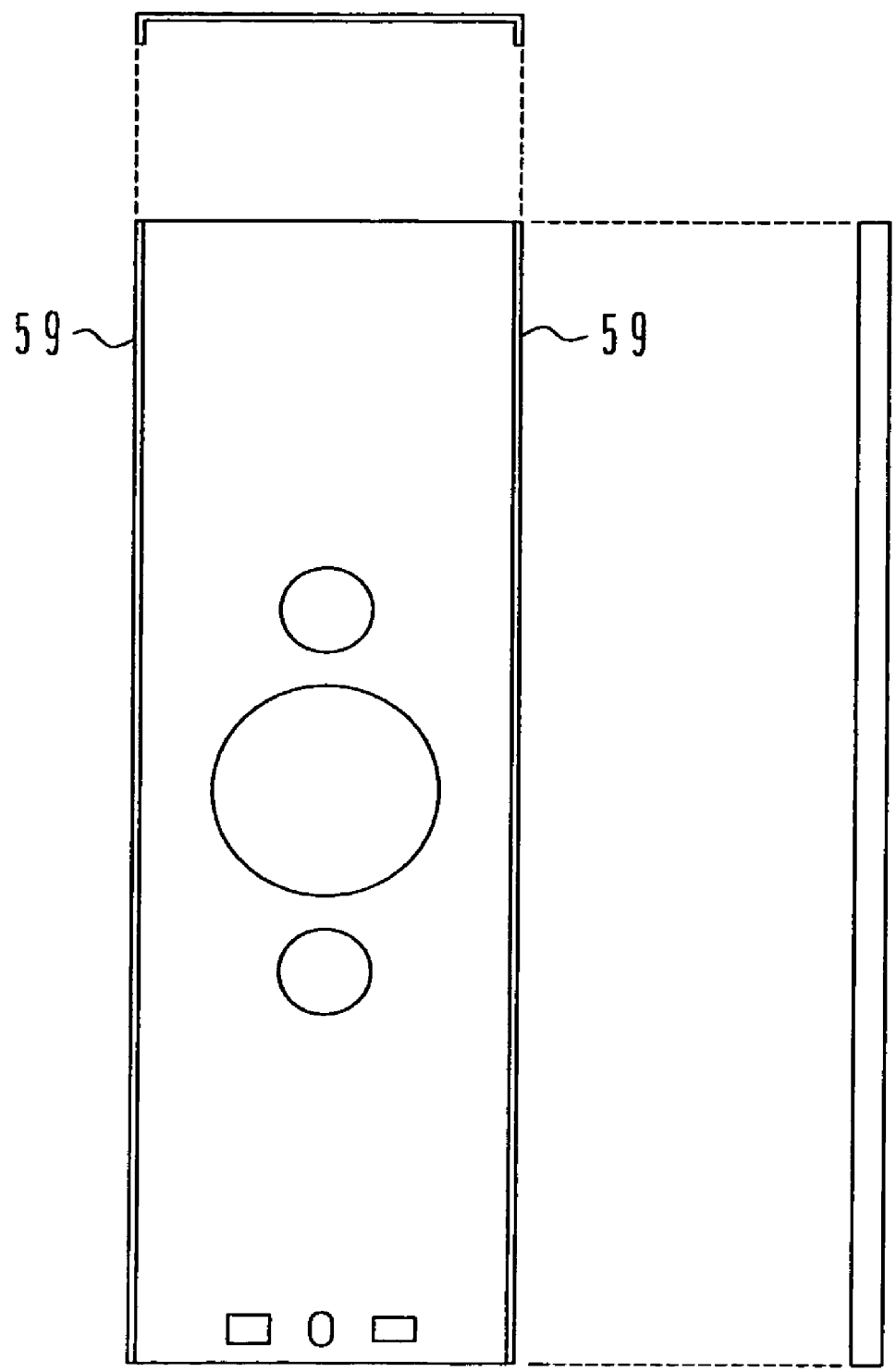
FIG. 7 is a plan view, a front view and a side view showing a conventional clamper holder.

FIG. 7 shows a clamp holder used conventionally. Upright ribs 59 are formed on opposing edges along the short side direction over the whole length along the long side direction. The rectifiers of the repetitive structures are not formed.

TABLE 1

| Shape of Clamper Holder | Disk Vibration Angles | | |
|---|---|---|---|
| | Radial Direction | Jitter Direction | Average |
| FIG. 2 | 0.138 | 0.138 | 0.138 |
| FIG. 5 | 0.107 | 0.107 | 0.107 |
| FIG. 6 | 0.161 | 0.161 | 0.161 |
| FIG. 7 (Conventional) | 0.400 | 0.420 | 0.410 |

As understood from Table 1, disk vibrations can be suppressed by using the clamper holders 28 and 52 shown in FIGS. 2 and 5 more than the clamper holders shown in FIGS. 6 and 7. The disk vibration angles are largest when the clamper holder having upright ribs shown in FIG. 7 is used. It can be considered that the upright ribs disturb an air flow and generate a large turbulent air flow. The disk vibration angles are reduced considerably by the flat clamper holder as the comparative example shown in FIG. 6. It can be considered that the turbulent air flow is suppressed.

The clamper holders shown in FIGS. 2 and 5 further reduce the disk vibration angles. It can be considered that although in the comparative example shown in FIG. 6, a turbulent air flow still exists in the plane along the disk surface, the structures shown in FIGS. 2 and 5 reduce the turbulent air flow. When the comparison is made between the structures shown in FIGS. 2 and 5, the structure shown in FIG. 5 has smaller disk vibration angles. It can be considered that the three-dimensional rectifier structure is more effective for turbulent air flow suppression than the planar rectifier structure.

Experiments were conducted on the influence of the opening 51 by using a clamp holder without rectifiers shown in FIG. 6.

Table 2 shows the measurement results of disk vibration angles during a predetermined high speed rotation at different widths of the notches 24 and 26 formed on the right and left side walls 22 and 20 of the frame 10. In Table 2, "All Openings" means that all openings (51a, 51b and 51c) of the opening 51 exist in FIG. 3B, and "Only Left Opening" means that only the opening 51a above the clamp holder is formed without the opening 51b and 51c of the opening 51 (the width of the notches 24 and 26 is set to about the length of the clamp holder 28 along its short side direction).

TABLE 2

| | Disk Vibration Angles | | |
|---|---|---|---|
| Width of Recess | Radial Direction | Jitter Direction | Average |
| All Openings | 0.161 | 0.161 | 0.161 |
| Only Left Opening | 0.170 | 0.170 | 0.170 |

As understood from Table 2, the disk vibration angles increase for the sample of "Only Left Opening". It can be understood that the disk vibrations can be suppressed by broadening the notches 24 and 26.

Figure 8:
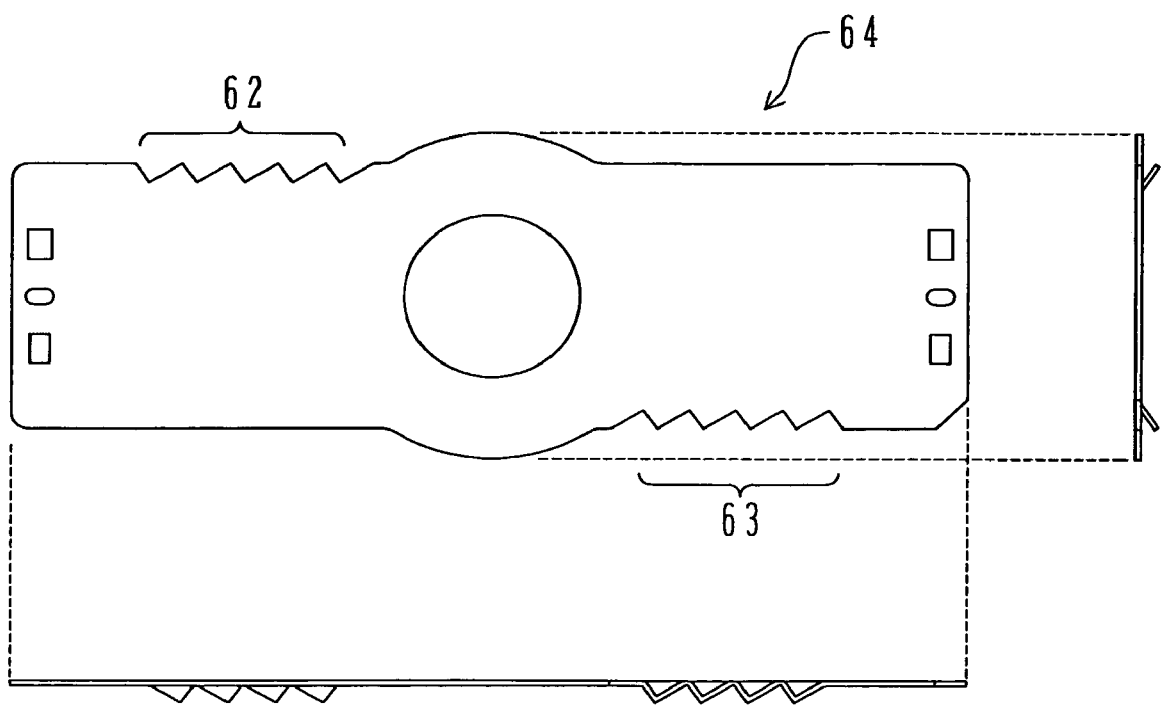
FIG. 8 is a plan view, a front view and a side view showing a rectifier formed on a clamper holder according to another embodiment of the invention.
Figure 9A:
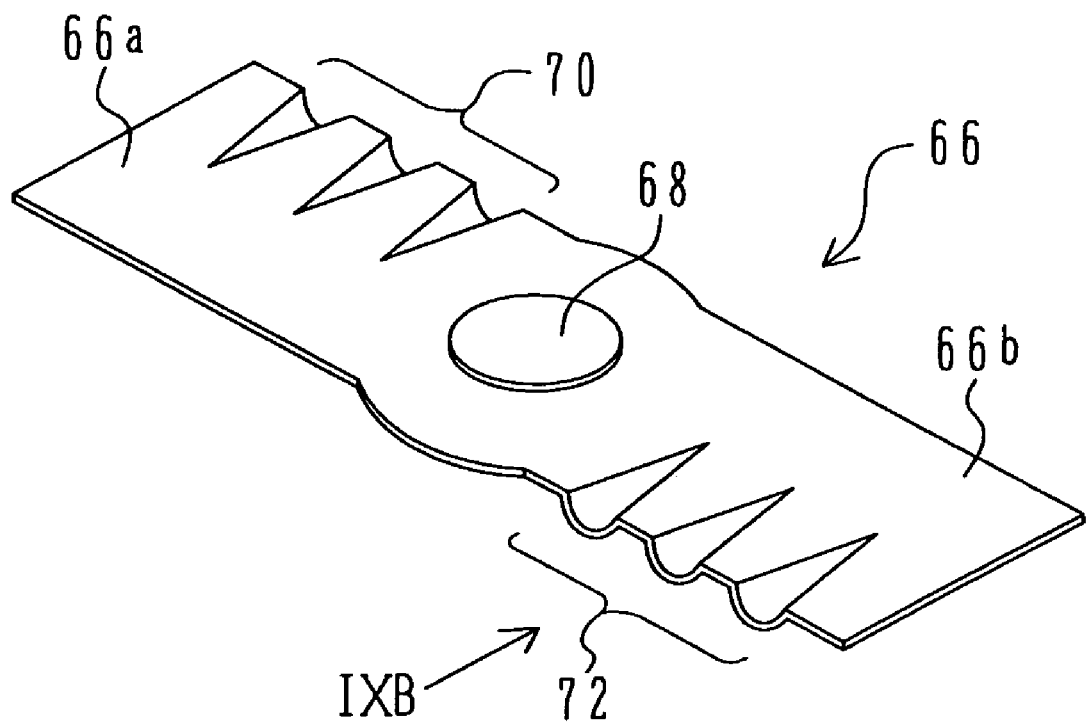
FIGS. 9A and 9B are a perspective view and a side view showing a rectifier formed on a clamper holder according to still another embodiment of the invention.
Figure 9B:
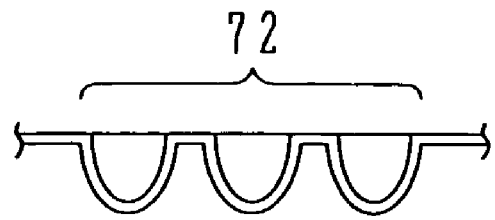

FIGS. 8, 9 and 10 show other configurations of a rectifier formed on the clamper holder.

In a clamper holder 64 shown in FIG. 8, each wave constituting wave-shaped repetitive structures 63 and 64 is bent downward to form the three-dimensional structure of the repetitive structures both in the plan direction and in the elevation direction. The effect similar to that of the three-dimensional structure shown in FIG. 5 can be expected. Although the projection portion as viewed in plan becomes a convex portion as viewed in front, the projection portion as viewed in plan may be made a concave portion as viewed in front.

In a clamper holder 66 shown in FIG. 9, repetitive structures 70 and 72 are formed on an elongated metal plate in which concave portions are formed on plate portions 66a and 66b, the repetitive structures gradually becoming deeper toward the edge of the metal plate. At the end of the output side of an air flow, the repetitive structures have a wave shape as viewed in elevation and a wave surface shape that the end of each wave is continuous with a plane of the clamper holder 66, and the amplitude of the wave surface gradually lowers at positions remotely from the edge of the metal plate. A rectifying function by the three-dimensional structure can be expected. Instead of the concave portion, a convex portion may be formed.

Figure 10A:
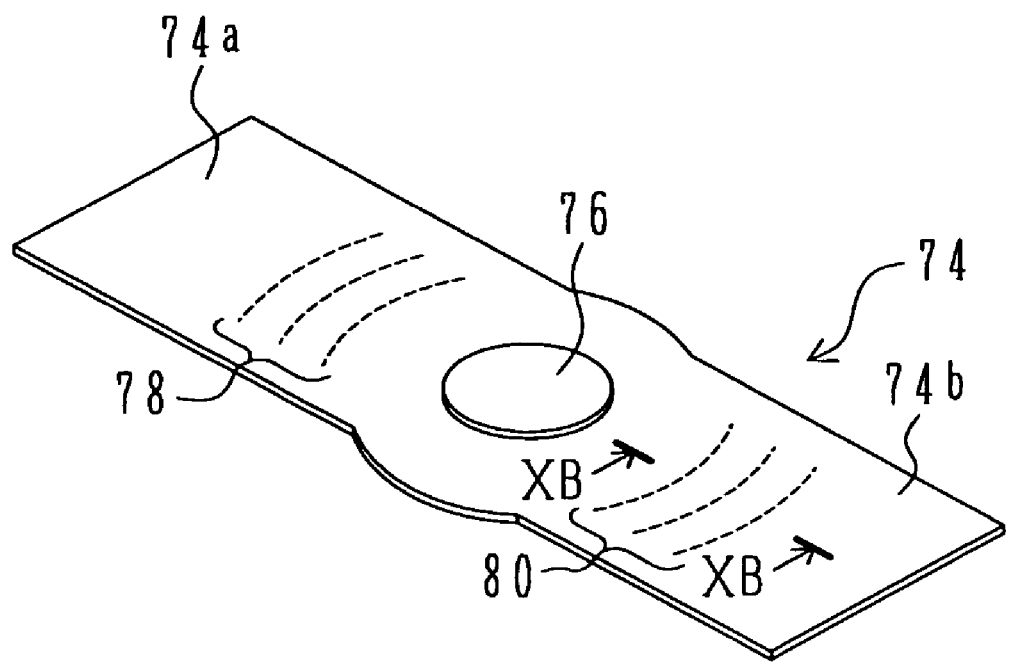
FIGS. 10A and 10B are a perspective view and a side view showing a rectifier formed on a clamper holder according to still another embodiment of the invention.
Figure 10B:
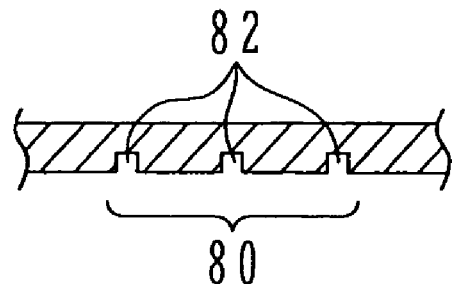

In a clamper holder 74 shown in FIG. 10A, repetitive structures 78 and 80 are formed on the clamper holder of an elongated metal plate. The repetitive structures have a plurality of concave stripes (or convex stripes) 82 formed along a disk track direction on the lower surfaces of plate portions 74a and 74b on both sides of a clamper 76. FIG. 10B is a cross sectional view taken along line XB-XB shown in FIG. 10A. The rectifying effect by the three-dimensional structure can be expected. Concave or convex stripes may be formed on the clamper upper surface.

Figure 11:
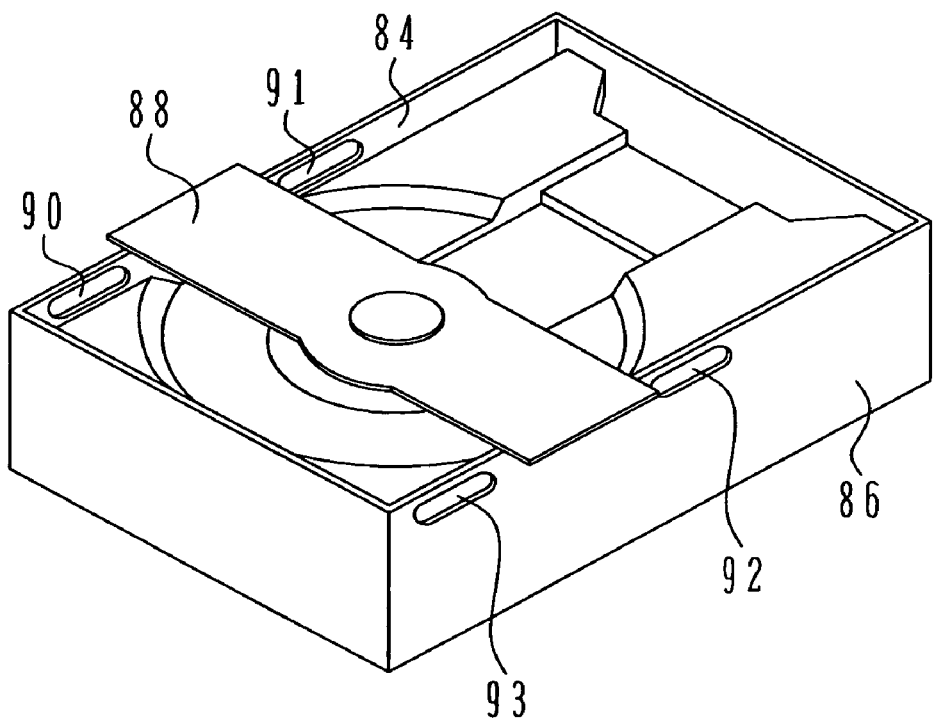
FIG. 11 is a perspective view of an air flow guide opening formed in right and left frame side walls according to another embodiment of the invention.

FIG. 11 shows another configuration of an air flow guide opening formed on the right and left frame walls. A clamper holder 88 is mounted on the top edges of the right and left frame side walls 84 and 86. Holes 90, 91, 92 and 93 are formed through the right and left side walls 84 and 86 at positions on both sides of the mount areas of the clamper holder 88. An outer ornamental cover (FIG. 3A) is disposed outside of the right and left side walls, with the spaces constituting the space through which an air flow flows being interposed therebetween. A portion of an air flow generated above the disk surface during a disk rotation enters ones of the holes 90 and 92 and exits from the others of the holes 91 and 93 via the space between the side walls 84 and 86 and the outer ornamental cover.

Figure 12:
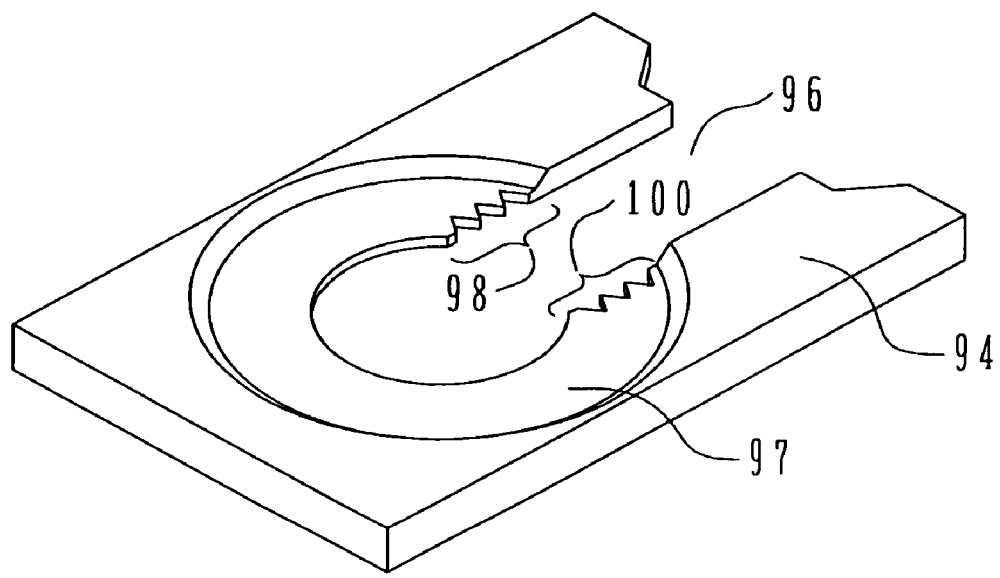
FIG. 12 is a perspective view of a rectifier formed on a pickup advance opening of a disk tray.

FIG. 12 shows an embodiment of rectifiers formed in a pickup advance or access path opening of a disk tray. Repetitive structures of a wave shape as viewed in plan are formed on opposing edges 98 and 100 of the pickup advance opening 96 of the disk tray 94, elongated along a direction crossing a tangential direction of the disk track, across a recess 97 of a disk tray 94, on which an optical disk is to be placed.

Figure 13A:
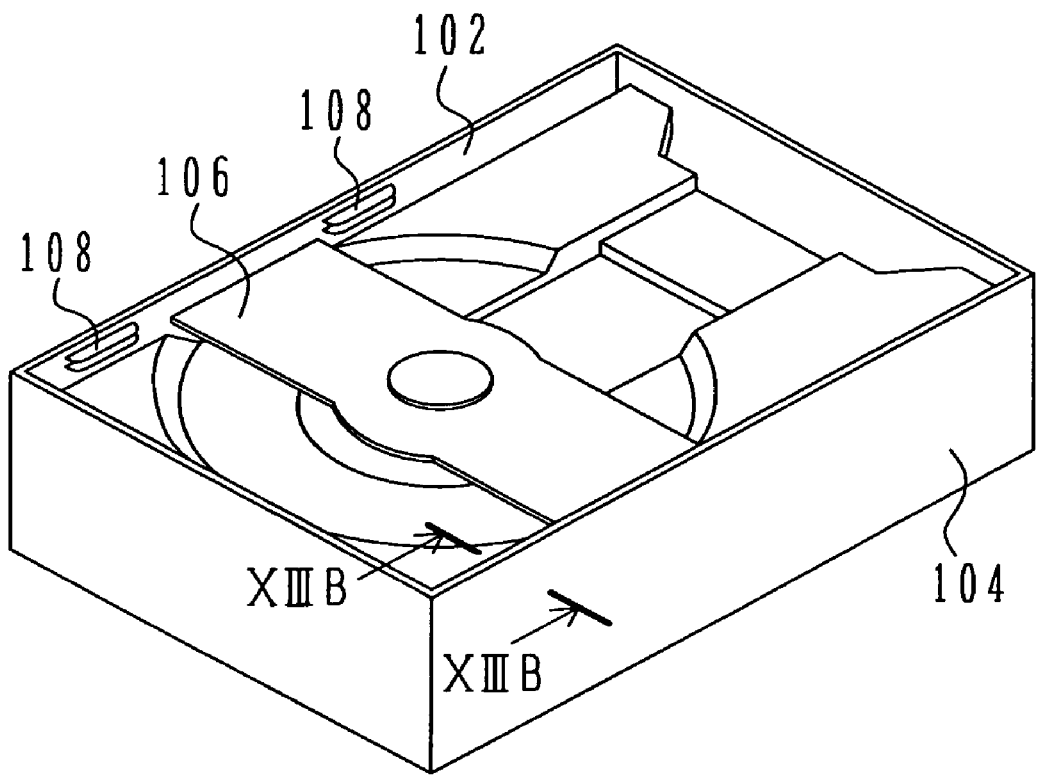
FIGS. 13A and 13B are a perspective view and a cross sectional view showing the configuration of a rectifier formed on the inner walls of right and left frame side wall.
Figure 13B:
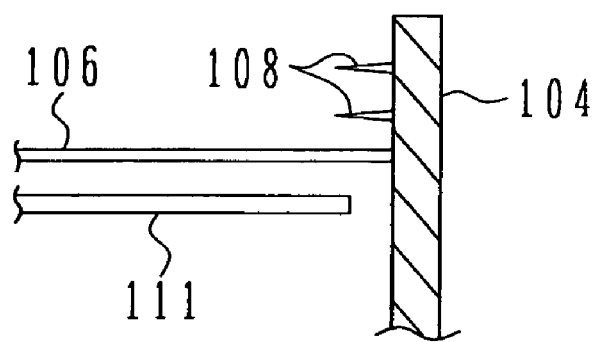

FIGS. 13A and 13B show a configuration of rectifiers formed on the inner surfaces of the right and left frame side walls. FIG. 13 is a perspective view and FIG. 13B is a cross sectional view taken along line XIIIB-XIIIB shown in FIG. 13A. A clamper holder 106 is mounted on the top edges of the right and left frame side walls 102 and 104. A plurality of convex stripes 108 extending along a horizontal direction are formed on the inner surfaces of the right and left side walls 102 and 104 at positions above an optical disk 111 and on both sides of the clamper holder 106. This three-dimensional structure guides an air flow.

Although the above embodiments are applied to a CD-R/RW drive, they may be applied to a DVD drive and other optical disk drives.

The present invention has been described in connection with the preferred embodiments. The invention is not limited only to the above embodiments. For example, the shape as viewed in plan for changing the resistance of an air flow and the three-dimensional structure directly guiding an air flow may be altered in various ways. It will be apparent to those skilled in the art that other various modifications, improvements, combinations, and the like can be made.

The invention claimed is:

1. An optical disk drive comprising:
   a turntable for mounting and rotating an optical disk;
   a housing having a ceiling plate above the turntable;
   a plate member disposed between an upper surface of the turntable and the housing above the turntable and extending along a direction crossing disk tracks, the plate member creating spaces for guiding air flow generated between the upper disk surface and a lower surface of the ceiling plate of the housing during rotation of the optical disk, respectively in between the disk upper surface and a lower surface of the plate member and in between an upper surface of the plate member and the housing; and
   a repetitive structure formed on edge portions of the plate member and extending along the direction crossing the disk tracks, the repetitive structure creating space having a high resistance to air flow and space having a low resistance to air flow, and rectifying the air flow generated during disk rotation above the upper disk surface to suppress turbulence and enhance laminar flow.

2. An optical disk drive according to claim 1, wherein the repetitive structure has a repetitive shape as viewed in plan.

3. An optical disk drive according to claim 2, wherein the repetitive structure has also a repetitive shape as viewed in elevation synchronized with the repetitive shape as viewed in plan.

4. An optical disk drive according to claim 1, wherein the repetitive structure is formed on the edge of the plate member on an output side of the air flow generated above the disk upper surface during disk rotation.

5. An optical disk drive according to claim 1, wherein the plate member is a metal plate not formed with a rib on the edge portion extending along a direction crossing the disk tracks.

6. An optical disk drive according to claim 1, wherein the plate member is formed with a clamper, and the optical disk drive further includes a drive mechanism for rotating the optical disk in a state that the optical disk is compressed between the turntable and the clamper.

7. An optical disk drive according to claim 6, wherein the plate member has an elongate plate shape, the clamper is held in a central area of the plate member along a long side direction, opposite end portions of the plate member are fixedly supported, and the repetitive structure is formed on plate portions of the plate member on both sides of the clamber along the long side direction.

8. An optical disk drive according to claim 1, wherein the repetitive structure is a repetition of convex stripes formed on the lower surface of the plate member and extending along a disk track direction.

9. An optical disk driver according to claim 1, wherein the repetitive structure terminates a repetition at a position of the edge portion corresponding to a position detracted by a predetermined distance from an outer circumference of the optical disk.

10. An optical disk drive comprising:
a disk tray having an opening extending along a direction crossing a tangential direction of a disk track; and
a repetitive structure formed on opposite end portions of the opening and extending along the direction crossing the disk tracks, the repetitive structure creating space having a high resistance to air flow and space having a low resistance to air flow, and rectifying an air flow generated during disk rotation to suppress turbulence and enhance laminar flow and having a wave shape as viewed in plan.

* * * * *